United States Patent [19]

Huffman et al.

[11] 4,416,009
[45] Nov. 15, 1983

[54] SYNCHRONOUS COUPLING OF FRAMED DATA IN DIGITAL TRANSMISSION

[75] Inventors: Charles E. Huffman; Stephen R. Southerland, both of Plano, Tex.

[73] Assignee: Rockwell International Corporation, El Segundo, Calif.

[21] Appl. No.: 206,937

[22] Filed: Nov. 14, 1980

[51] Int. Cl.³ .............................................. H04J 13/00
[52] U.S. Cl. ....................................... 370/100; 370/93
[58] Field of Search ..................... 370/92, 93, 100, 108

[56] References Cited

U.S. PATENT DOCUMENTS

| | | | |
|---|---|---|---|
| 2,701,305 | 2/1955 | Hopper | 370/93 |
| 3,760,109 | 9/1973 | Kogo et al. | 370/93 |
| 4,164,628 | 8/1979 | Ward et al. | 370/93 |

Primary Examiner—Marshall M. Curtis

Attorney, Agent, or Firm—Michael E. Taken; V. Lawrence Sewell; Howard R. Greenberg

[57] ABSTRACT

A synchronization system for data coupling apparatus is provided by delaying clocked frame identification signals instead of delaying the data in data buffer storage. Data is passed between input and output transmission lines with only the inherent delay incurred in the requisite data manipulation therebetween. The framing alignment information extracted at the input is connected to the output through a delay such that the data and framing identification signals arrive at the output at the same time and in synchronous alignment. In addition to eliminating the need for a data buffer, the system also eliminates the need for a second identification bit alignment location derivation from the output. The system utilizes an edge-aligned clock which enables substitutional insertion of data to a desired location in the bit stream.

10 Claims, 20 Drawing Figures

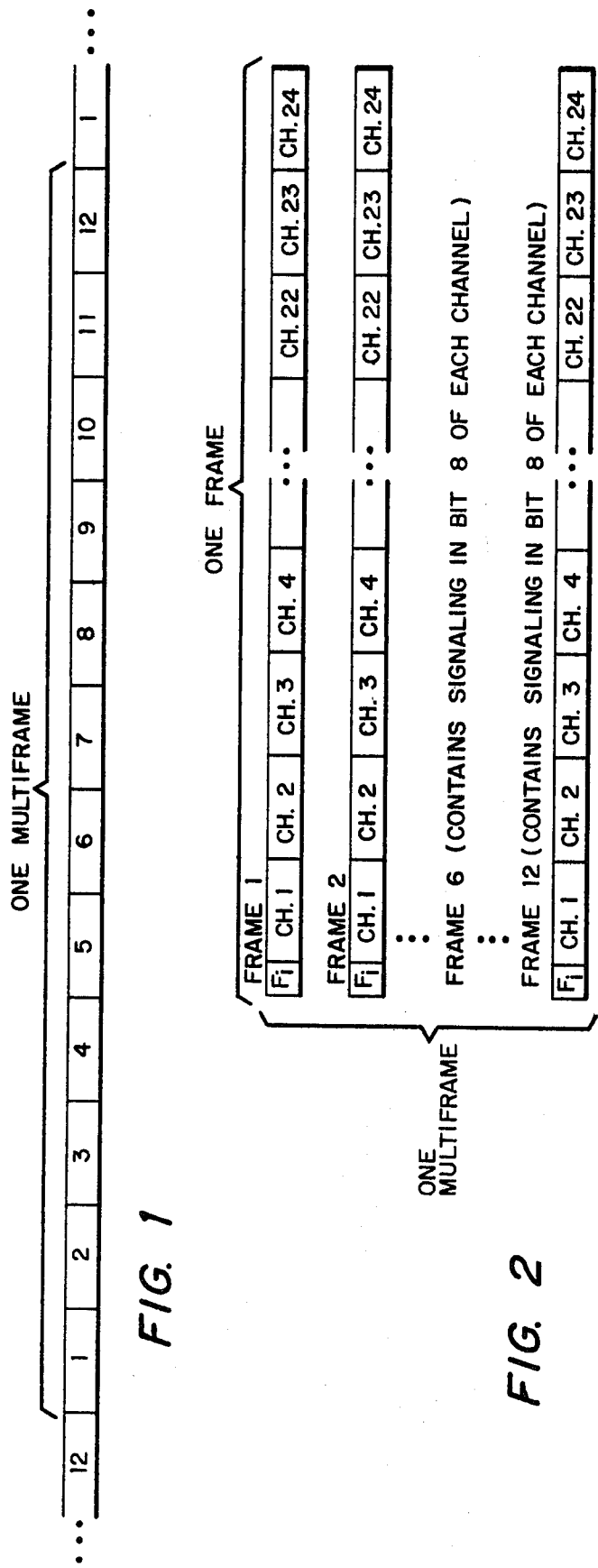
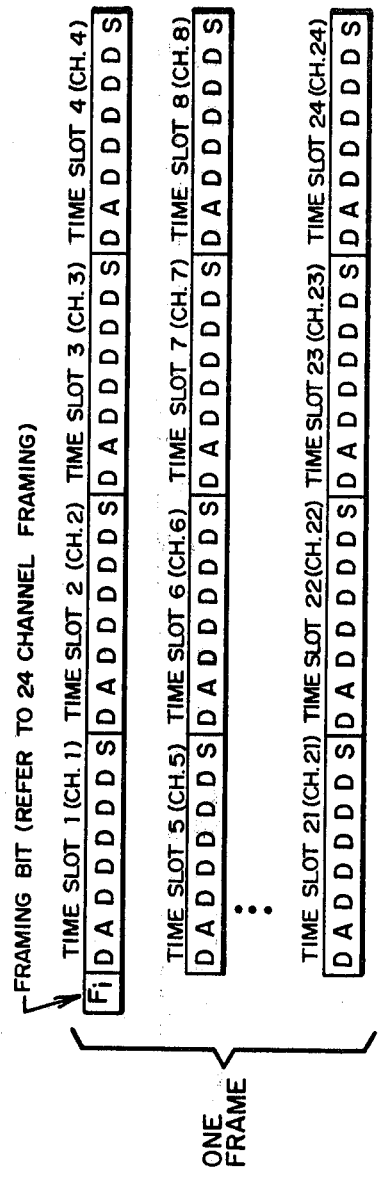
FIG. 1
FIG. 2
FIG. 3

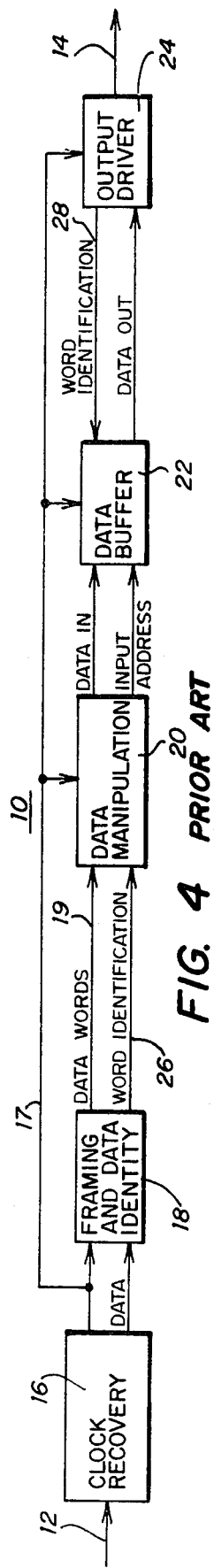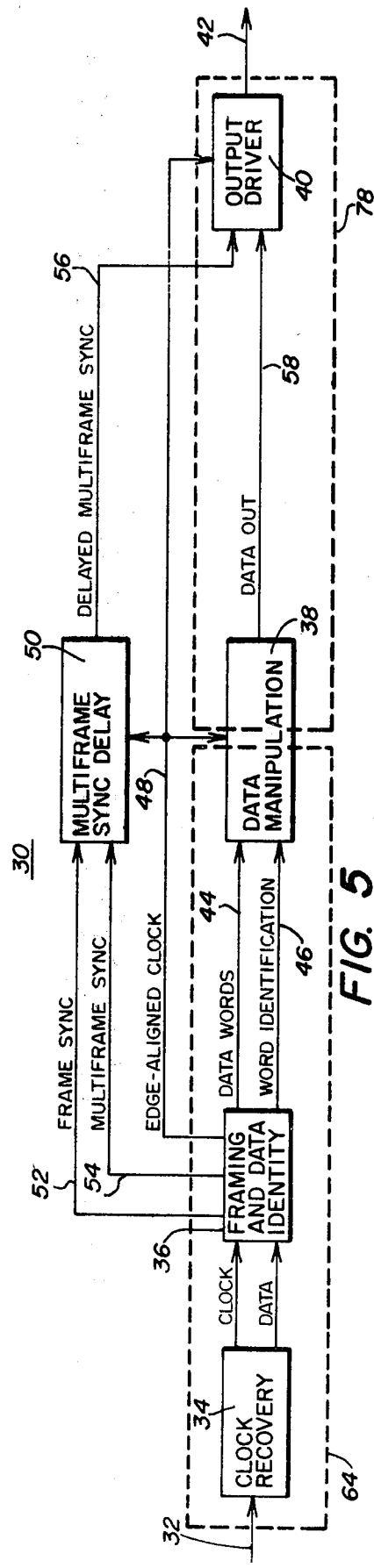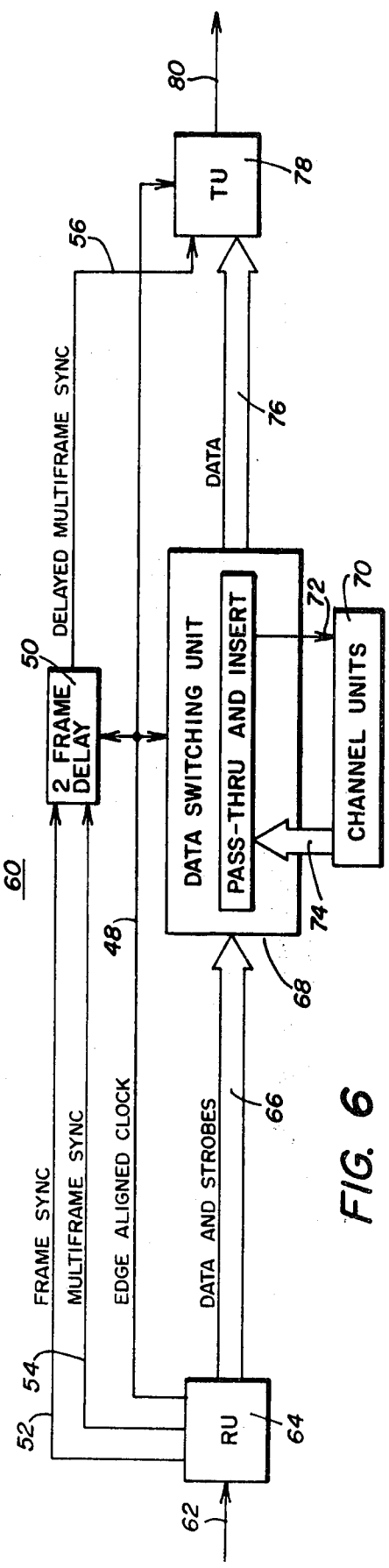

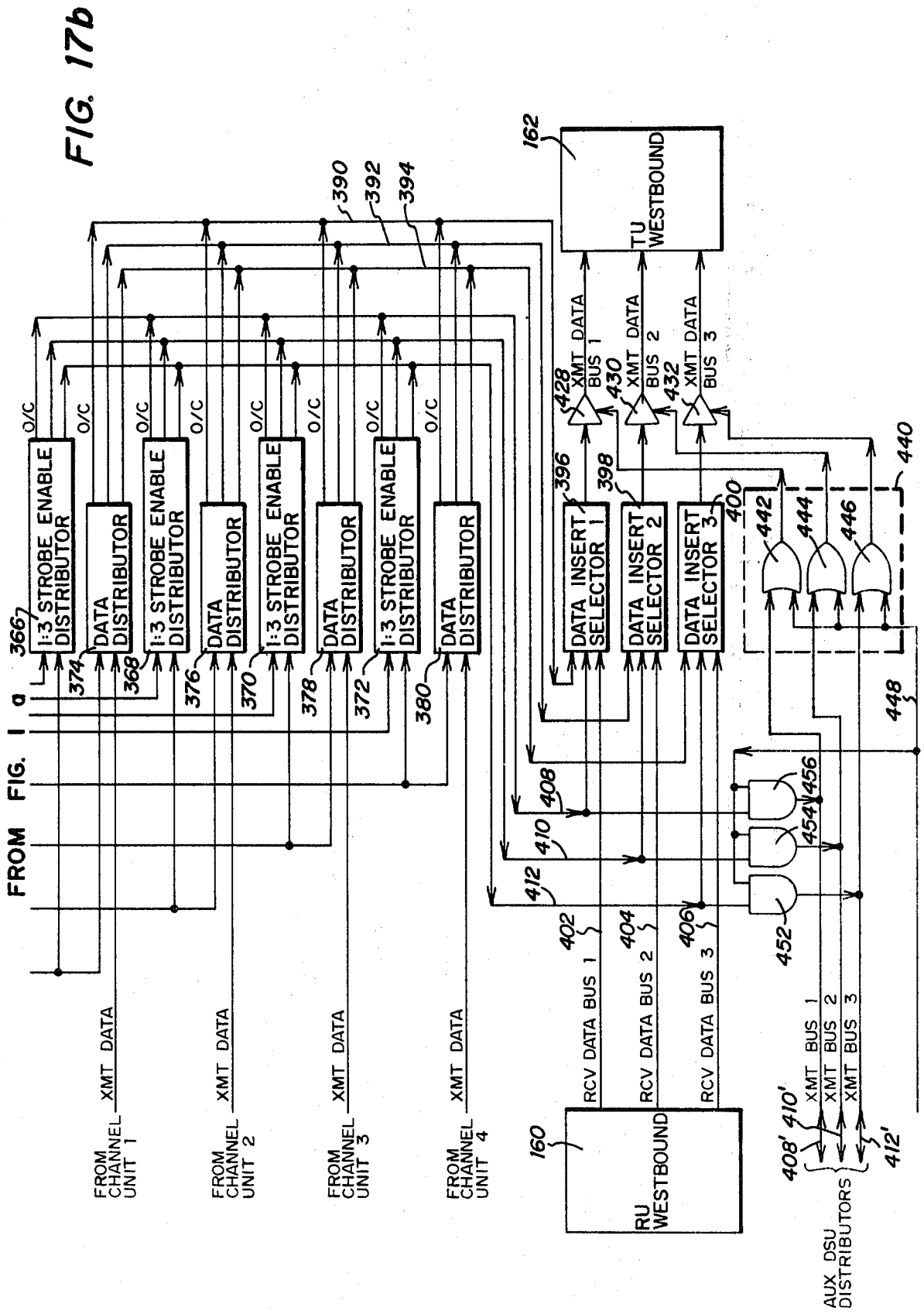

SYNCHRONOUS COUPLING OF FRAMED DATA IN DIGITAL TRANSMISSION

TECHNICAL FIELD

The invention relates to a synchronization system for data coupling apparatus in a digital transmission system carrying data in a framed format on a transmission medium, including such coupling apparatus as a drop and insert channel bank.

BACKGROUND

Data coupling apparatus is interposed in a transmission medium at a data station to enable some function to be performed by or on the data. The data from the transmission medium is routed through the data station and data manipulation means for performance of the designated function and then back onto the transmission medium.

For high density usage applications, it is common for the transmission medium to carry a plurality of multiplexed digital channels thereon in a framed format. For example, a multiframe may contain a plurality of frames, and each frame may contain a plurality of channels. The coupling apparatus includes an input which delivers the received data to data manipulation means for performance of the desired function. The data is then delivered to a data buffer storage element providing a delay. The coupling apparatus includes an output which arbitrarily selects where a word is to begin in the bit stream output therefrom to the transmission medium. This output driver sends these arbitrarily chosen word identification signals to the data buffer. The delay in the data buffer accommodates the difference in the bit stream location of word identification signals from the input and word identification signals from the output, i.e. the data input to the buffer is stored or delayed until it falls into alignment with the word identification bit location assigned by the output driver. The data buffer is thus needed because the word identification bit location assignment used by the output driver is not the same as the word identification bit location assignment used by the input as extracted from the incoming data.

Besides the need for a data buffer, the above described coupling apparatus is not suitable for substitutional insertion of data into the bit stream through the manipulation means. This is because the clock driving the manipulating means is not oriented with the data words input thereto, resulting in loss of frame alignment. The location of the desired insert channel in the bit stream is thus not known, and this ambiguity is further compounded by the delay in the data buffer noted above.

SUMMARY

The present invention provides a simple and efficient synchronization system for data coupling apparatus. The invention enables both the input and output to use the same word identification bit location assignment and eliminates the necessity of a data buffer. The invention further enables substitutional insertion of data through the coupler into the bit stream.

Instead of delaying the manipulated input data into alignment with the output word locations chosen by the output driver, the present invention delays clocked frame identification signals. Data from the input and framing identification bit location assignment signals arrive in synchronous alignment at the output. The input data is clocked through the manipulation means with only the inherent delay caused thereby and delivered directly to the output without buffered delay. Framing identification or synchronization signals derived from the input are delivered through synchronization delay means which delays the framing identification signals by a predetermined increment. The data and the framing identification signals arrive at the output at the same time. The output does not have to arbitrarily choose bit locations for word boundaries, etc., but rather is in exact but delayed synchronism with the input.

The input also provides a clock signal edge-aligned with data input to the manipulation means. This edge-aligned clock signal drives the output and the manipulation means such that the location of a desired insert channel in the manipulation means is known and will retain such position at the output.

DESCRIPTION OF THE DRAWINGS

FIGS. 1-3 illustrate a known framing format, useful in teaching the invention.

FIG. 4 is a schematic circuit diagram of prior art data coupling apparatus.

FIG. 5 is a schematic circuit diagram of a synchronization system and data coupling apparatus constructed in accordance with the invention.

FIG. 6 is a schematic circuit diagram showing an application of the circuit of FIG. 5.

FIGS. 7-18 illustrate in detail an implementation of the synchronization system of the invention in a drop and insert channel bank data coupling apparatus.

FIG. 7 is an illustration of transmission system having end terminals with a transmission medium therebetween.

FIG. 8 illustrates a typical drop and insert approach using a pair of fully equipped channel banks cross-connected at the voice frequency interface.

FIG. 9 illustrates a unidirectional drop and insert channel bank with digital pass-through and insert, and synchronized in accordance with the invention.

FIG. 10 illustrates the channel strobe and data bus matrix used in FIG. 9.

FIG. 11 illustrates a bidirectional drop and insert channel bank.

FIG. 12 illustrates the drop operation of FIGS. 9 and 11.

FIG. 13 illustrates the insert operation of FIGS. 9 and 11.

FIG. 14 schematically shows the drop circuitry of FIG. 12.

FIG. 15 schematically shows the insert circuitry of FIG. 13.

FIGS. 17a and 17b are a composite detailed circuit diagram of the west data switching unit (DSU) 148 of FIGS. 11 and 16.

FIG. 18 shows an alternate form of the bidirectional drop and insert channel bank of FIG. 11.

DESCRIPTION OF PRIOR ART

Figure 7:
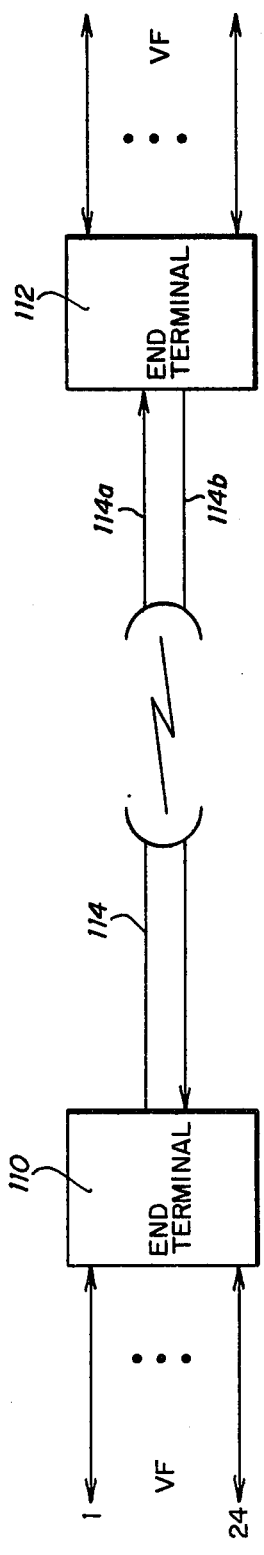

As an illustrative example, FIGS. 1-3 show the standard North American telecommunication framing format, to facilitate understanding of the following descriptions. This format is of course not a constraint of the invention. In this format, each path or line of a transmission medium, e.g. microwave radio link, hardwire line, etc., carries serial multiplexed data at a 1.544 Mb/s rate, with 24 channels to a frame and 12 frames to a multiframe. Each multiframe contains 2,316 bits at the 1.544 Mb/s rate. Each frame contains 193 bits at the 1.544 Mb/s rate. Each frame includes an initial framing bit $F_i$ plus 24 channel or word time slots. The framing bit code is 100011011100 for frames 1 through 12, respectively. Odd numbered frames are used for frame alignment, and even numbered frames are used for multiframe alignment. Each time slot is 8 bits wide.

FIG. 4 shows data coupling apparatus 10 constructed in accordance with prior art. This coupling apparatus is interposed serially in a transmission medium such that data on input transmission line 12 must pass through the coupling apparatus 10 to reach output transmission line 14. Input transmission line 12 carries digital data in a given framing format, such as that described in conjunction with FIGS. 1-3. Coupling apparatus 10 includes at its input a clock recovery circuit 16 which extracts clock signals from the input data by any of a number of well-known techniques, such as by a phase locked loop. Clock recovery circuit 16 outputs data and clock signals to a framing and data identity circuit 18. This circuit looks for the above-noted framing bit code of the $F_i$ bits, and once recognized, assigns word or channel identification bit locations for delimiting data words, or channels. Circuit 18 outputs data words 19 and word identification signals 26 to data manipulation means 20. This data manipulation circuit enables desired functions to be performed on the data, or performs desired functions on ancillary devices in accordance with the content of the data, or affords a given interaction with an interface device, etc. The data experiences a certain amount of inherent delay in passing through data manipulation circuit 20. Circuit 20 is clocked by the extracted clock signal 17 from recovery circuit 16.

The manipulated data output from circuit 20 is input to data buffer 22 providing a delay. This circuit is clocked by the extracted clock signal 17 from recovery circuit 16. An output driver circuit 24 arbitrarily assigns the initial word identification bit location in the data stream output therefrom on line 14. Output alignment word identification signals 28 are sent to data buffer 22 which then outputs the data to driver circuit 24 in accordance with the channel or word delimitation assigned by circuit 24. Buffer 22 stores the data input thereto from circuit 20 until it falls into alignment with the word identification locations assigned by driver circuit 24, i.e. buffer 22 delays the data until driver circuit 24 indicates it is ready and has chosen its word alignment location. Circuit 20 typically sends input address information to buffer 22 to indicate where the data is to be stored therein, and signals 28 typically include output addressing information for retrieval. Output driver circuit 24 is clocked by the extracted clock 17 from recovery circuit 16. This same operation may be accomplished by an elastic buffer with its own oscillator running at a given frequency.

In the coupler apparatus of FIG. 4, there are two different word identification alignment locations, one from the input and the other from the output. Data buffer 22 accommodates the difference between these two word identification alignment locations. The two different sets of word identification signals are designated input word identification signals 26 and output word identification signals 28.

DESCRIPTION OF THE INVENTION

FIG. 5 shows a synchronization system and data coupling apparatus 30 constructed in accordance with the invention. Data from transmission medium 32 is received at input means including a clock recovery circuit 34 and a framing and data identity circuit 36. The latter circuit delivers data words 44 and word identification signals 46 to a data manipulation circuit 38 which outputs the manipulated data 58 to output driver circuit 40 which in turn delivers the data to transmission medium 42.

Framing and data word identity circuit 36 functions similarly to circuit 18 of FIG. 4 by receiving data and extracted clock signals from clock recovery circuit 34 and delivering data words 44 and word identification signals 46 delimiting data words 44. Circuit 36 also delivers clock signals 48 which are edge-aligned with data words 44. The edge-aligned clock may be provided, for example, by a type D flip-flop receiving the data from circuit 34 at its D input and receiving the extracted clock signals from circuit 34 at its clock input, and delivering data words 44 from its Q output. The data is thus retimed or shifed into edge alignment with the clock.

Framing and data identity circuit 36 also delivers framing identification signals to synchronization delay means 50. For the above described format, a frame sync signal 52 is delivered for each framing bit $F_i$, and a multiframe sync signal 54 is delivered in response to the above noted framing bit code sequence for initiating a cycle. Delay means 50 delays the framing identification signals by a predetermined increment such that a framing identification signal on output 56 arrives at output driver 40 at the same time as data 58 from manipulation circuit 38. In this manner, the framing identification signal 56 synchronously aligns with its appropriate data 58 in output driver 40. For the above format, delay means 50 is a multiframe sync delay which delays the multiframe sync signal by an increment equal to the inherent delay of data transmission through data manipulation circuit 38.

Data from manipulation circuit 38 is delivered directly to output driver 40. The data is not delivered through a data buffer, but rather passes through the system in real time with only inherent delays attendant thereto. Furthermore, the data is delivered to output driver 40 without return alignment output identification signals such as 28 in FIG. 4. The data passes through output driver 40 independently of output alignment identification and data buffering.

As the data travels through output driver 40, the framing identification signal on line 56 tells the output driver 40 where it is in the bit stream, i.e., the signal on line 56 identifies which frame is currently passing through output driver 40. This identification or sync signal on line 56 does not interfere with the data passing through driver 40. The data passes through driver 40 in coordination with the sync signal on line 56. The data and the sync signals on 58 and 56 are coordinated by their synchronously aligned arrival time at output driver 40.

Edge-aligned clock signals 48 drive data manipulation circuit 38, multiframe sync delay 50 and and output driver 40. Since clock signal 48 is edge-aligned with data words 44, these signals stay in synchronism through data manipulation circuit 38.

FIG. 6 shows the circuit of FIG. 5 in a drop and insert channel bank 60. Data on transmission medium 62 is input to a receive unit (RU) 64 which includes clock recovery circuit 34, framing and data word identity circuit 36 and a portion of data manipulation circuit 38, as shown in dashed line in FIG. 5. The data manipulation portion of receive unit 64 demultiplexes the input data to a lower rate and outputs a plurality of data buses and channel strobes 66. One embodiment with the above described format utilized 3 data buses and 8 channel strobes, whereby to define each of the 24 channels. This manipulation of data requires a one frame delay, such that as receive unit 64 is receiving frame 5 from transmission medium 62, it is outputting frame 4.

Bus matrix structure 66 is connected to a data switching unit 68 which includes selective gating circuitry for either passing the data therethrough or substitutionally inserting data from any of a number of channel units 70 into the bit stream. In the selectively chosen insert mode, the strobes are output on line 72 to clock data from the channel units into the data switching unit 68 via bus 74 at the appropriate time slot. Data is inserted in bank 60 through data switching unit 68 in real time without data storage buffering. Both pass-through and insert modes are digital. There is substantially no delay between data entering on buses 66 and data output on buses 76.

The data output on buses 76 is delivered to a transmit unit (TU) 78 which includes the remaining portion of data manipulation circuit 38, and output driver 40, as shown in dashed line in FIG. 5. The manipulation portion of transmit unit 78 multiplexes the data on buses 76 back up to the higher speed and delivers this serial multiplexed data to transmission medium 80. This manipulation of data requires a one frame delay, and hence while transmit unit 78 is receiving frame 4 from buses 76, it is outputting frame 3.

Synchronization delay means 50 provides a two frame delay of the multiframe sync signal. This is the inherent delay which the data experiences in passing through the manipulation circuitry of receive unit 64 and transmit unit 78. The data experiences a one frame delay in passing through receive unit 64, and experiences a one frame delay in passing through transmit unit 78, such that as receive unit 64 is receiving frame 5, transmit unit 78 is outputting frame 3. Delay means 50 delays the sync or framing identification signal by two frames such that this signal waits for the data to arrive at the output driver section in transmit unit 78 such that the sync signal for frame 5 and the data for frame 5 arrive at output driver 40 at the same time in synchronous alignment.

Of particular significance is the insert mode enabled by the circuit of FIG. 6. Since the clock signals 48 are edge-aligned, data switching unit 68 knows where it is in the bit stream, i.e. which frame and channel is currently passing therethrough. This synchronous alignment location enables data to be inserted into the appropriate channel.

A detailed exemplary application of the synchronization system of the present invention in a drop and insert channel bank data coupling apparatus will now be given to facilitate understanding of this particular implementation of the invention and to engender a better appreciation of the scope of the invention including various modifications, alternatives, and other implementations.

FIG. 7 shows a digital transmission system having end terminals 110 and 112 and a transmission medium 114 therebetween. This transmission medium may, for example, take the form of span line or microwave radio paths. In a telecommunications system, it is common to provide high density usage by transmitting data in time division multiplexed form on transmission medium 114. The end terminals include multiplexing and demultiplexing circuitry and a voice frequency (VF) interface for receiving and transmitting a plurality of channels. For example, in North America, 24 channels are typically multiplexed for serially transmission over each transmission path 114a and 114b in accordance with the above-described format. 30 channel transmission is standard in Europe. Each end terminal is typically formed by a channel bank having the desired number of channels and the appropriate conversion circuitry.

Figure 8:
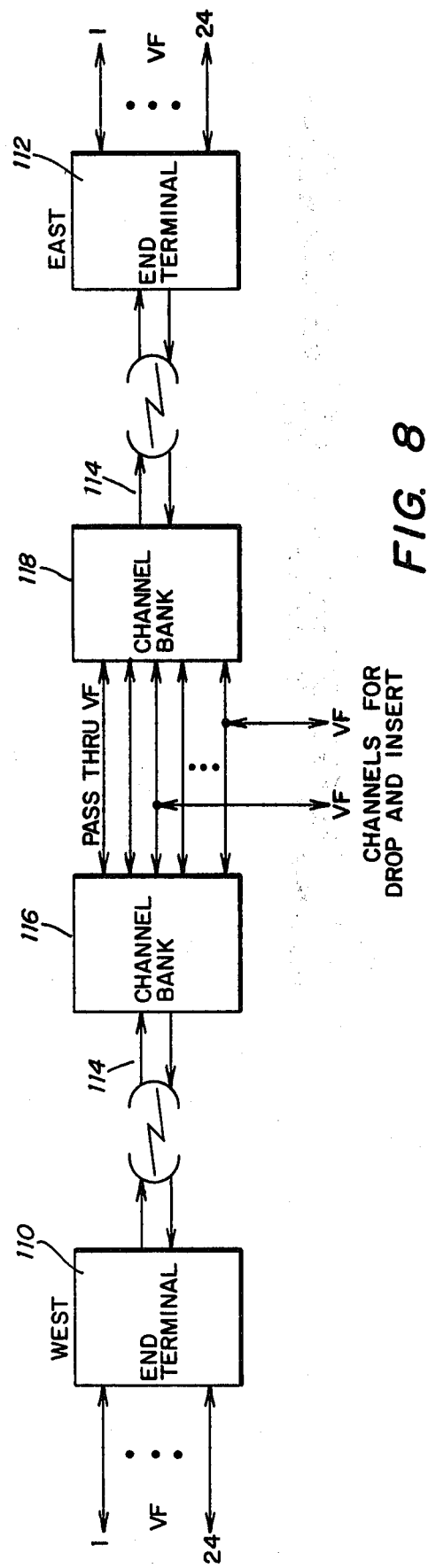

Somewhere along transmission medium 114 it may be desirable to receive or listen to the data being transmitted and to insert data onto the transmission medium 114. FIG. 8 shows the standard drop and insert approach where a pair of channel banks 116 and 118 are placed in the transmission medium 114 and cross-connected at the voice frequency interface. In order to enable any channel to be dropped and inserted, each channel bank 116 and 118 must be completely equipped, i.e., have dedicated conversion circuitry for each channel. Additionally, east bound through-traffic is converted by channel bank 116 to analog form and reconverted to digital form by channel bank 118, and vice versa for west bound through-traffic. These conversions degrade the signal. This signal degradation becomes objectionable when compounded by additional drop and insert locations further degrading the signal. These conversions limit the total number of drop and insert locations between end terminals.

Figure 9:
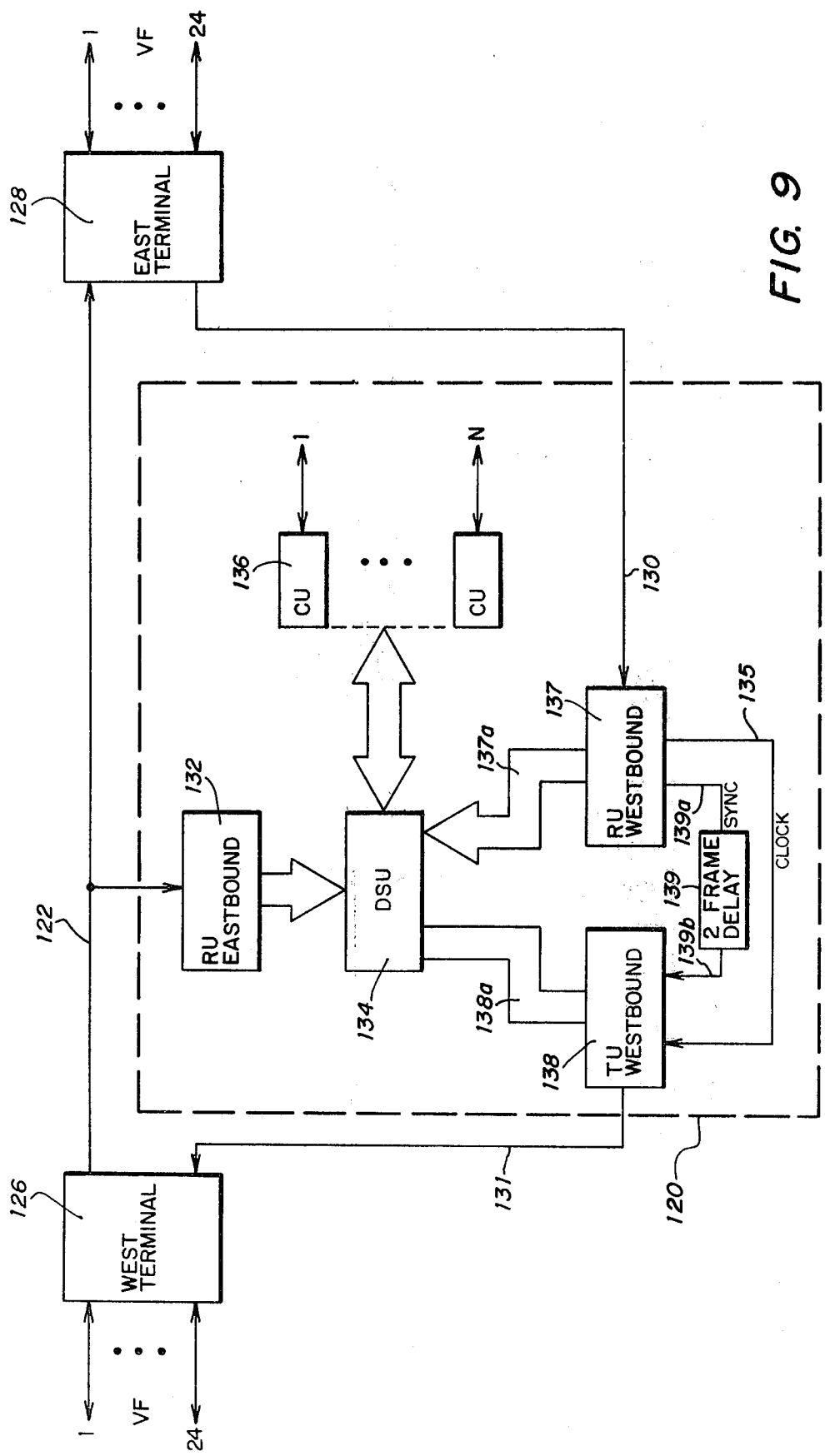

FIG. 9 shows a unidirectional drop and insert channel bank 120, within the dashed line, for digital pass through the insert, and which is synchronized in accordance with the invention. Channel bank 120 drops channels from the eastbound traffic on line 122 between west terminal 126 and east terminal 128, and inserts data in the westbound traffic between lines 130 and 131. Each of these lines carry data at the 1.544 megabit per second rate in accordance with the above described format.

Eastbound traffic on line 122 is delivered in parallel to the east terminal 128 and to a receive unit (RU) 132 in channel bank 120. Receive unit 132 demultiplexes the data to Y buses of X channels each, for example three buses each having eight channels. In a European system, the matrix could be, for example, four buses of eight channels each. The bus structure is not a constraint of the channel bank, nor is demultiplexing of the data (e.g. Y=1, X=24).

Figure 10:
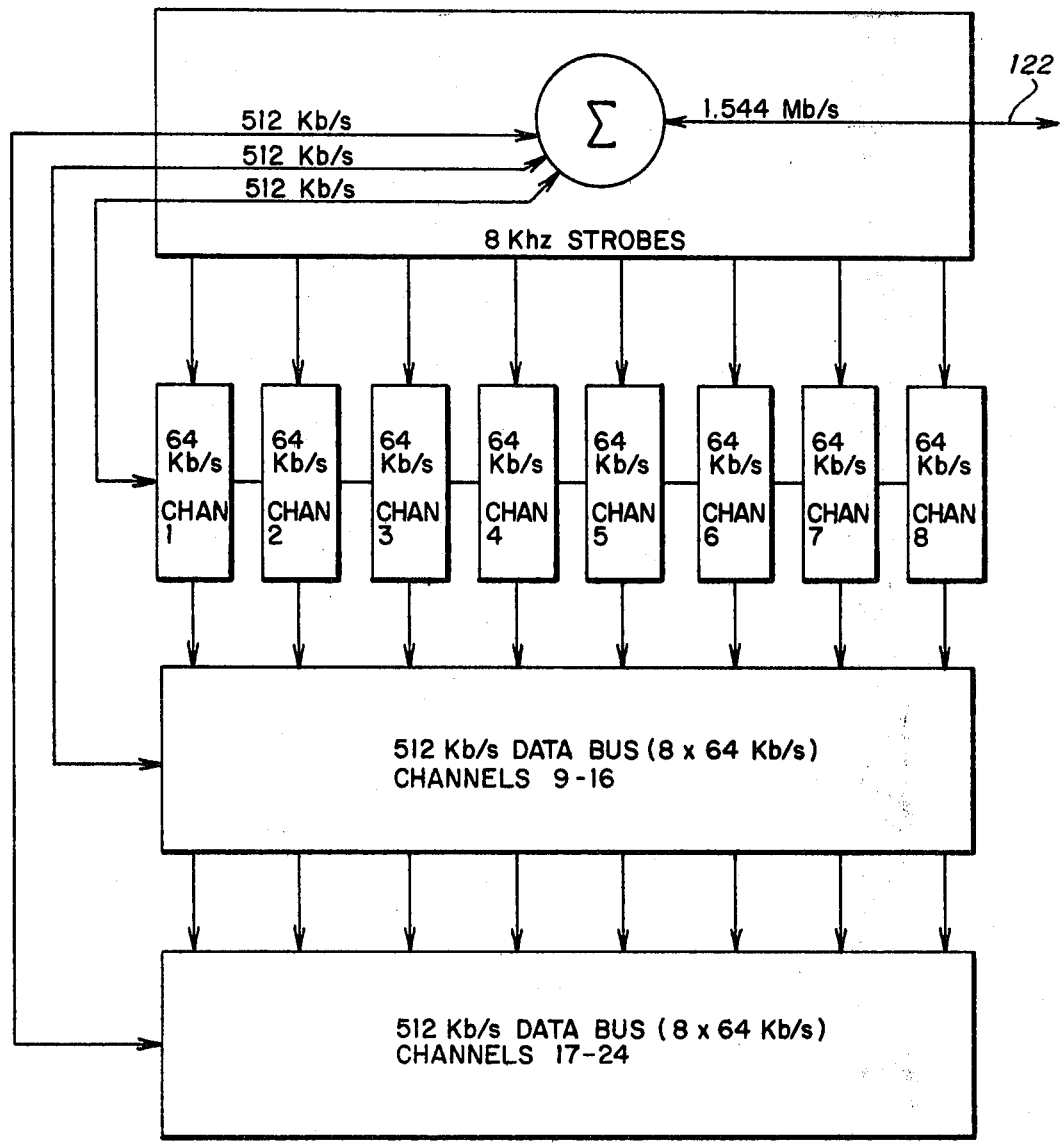

FIG. 10 shows a three bus by eight channel strobe matrix. Each of the three buses carries data at a 512 kilobit per second rate, which is approximately one-third of the 1.544 megabit per second rate on line 122. Three buses in conjunction with eight channel strobes at an 8 KHz rate provide channel selection. This 3×8 matrix thus defines the twenty-four channels on line 122.

The three data buses and the eight channel strobes are output from receive unit 132 to data switching unit (DSU) 134, FIG. 9. Data switching unit 134 extracts the specified data bus and channel strobe as chosen by the user and delivers channel data to N channel units (CU) 136. In one form, four channel units are provided. These channel units may be modules with standard voice interfaces or standard data interfaces (for example, to a computer link, etc.).

Data is inserted from channel units 136 to data switching unit 134 which substitutes the channel data in the appropriate time slot in the westbound traffic between lines 130 and 131. A westbound receive unit (RU) 137 sends three data buses and eight channel strobes to the data switching unit 134 which then either passes each channel unaltered or inserts data. Both the unaltered and inserted data are then sent to a westbound transmit unit (TU) 138 which multiplexes the data to serial form at the 1.544 megabit per second rate for tranmission to the west terminal 126.

Transmit unit 138 is synchronized to receive unit 137 as above taught. The sync signal is delayed by an integral channel time slot repetition period, for example a two frame delay provided by a counter register 139 corresponding to delay means 50 of FIGS. 5 and 6. Clock signal 135 corresponds to edge-aligned clock signal 48 of FIGS. 5 and 6. Signal 139a corresponds to the frame sync 52 and multi-frame sync 54 signals in FIGS. 5 and 6. Signal 139b corresponds to delayed multi-frame sync signal 56 in FIGS. 5 and 6. Buses 137a correspond to buses 66 in FIG. 6, and buses 138a correspond to buses 76 in FIG. 6. When receive unit 137 is receiving frame 5, channel 1 from line 130, for example, data switching unit 134 is receiving frame 4, channel 1 from receive unit 137. At the same time, data switching unit 134 is sending frame 4, channel 1 to transmit unit 138, and transmit unit 138 is sending frame 3, channel 1 to west terminal 126. Transmit unit 138 is thus two frames behind receive unit 137 due to the demultiplexing and then multiplexing operations performed. The sync signal is delayed by two frames such that the initial framing bit ($F_i$ in FIGS. 2 and 3) of frame 5 on line 130 also occurs at the beginning of frame 5 on line 131, not at the beginning of frame 3. The initial framing bit $F_i$ thus waits for its respective frame to catch up and then tells transmit unit 138 which frame it is outputting.

Figure 11:
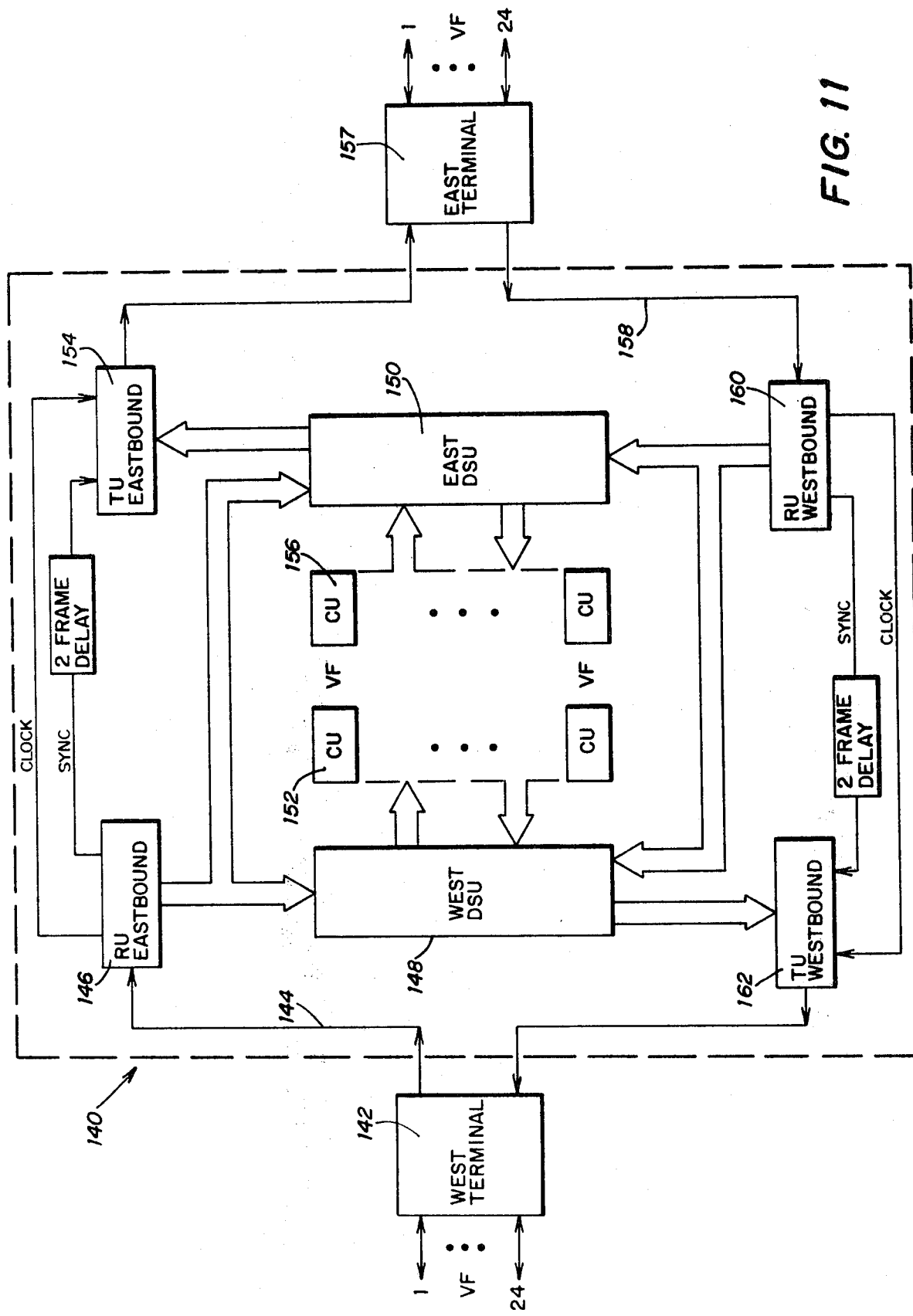

FIG. 11 shows a bidirectional drop and insert channel bank 140. Data from west terminal 142 travels eastbound on line 144 to eastbound receive unit (RU) 146. The data is then delivered to a west data switching unit (DSU) 148 and to an east data switching unit (DSU) 150. West switching unit 148 drops the channels to west channel units (CU) 152. East switching unit 150 passes the data from eastbound receive unit 146 unaltered to eastbound transmit unit (TU) 154 or inserts channel data from each channel units (CU) 156 and then passes the data to eastbound transmit unit 154. The output of eastbound transmit unit 154 is delivered to east terminal 157.

Data from east terminal 157 travels westbound on line 158 to westbound receive unit (RU) 160 which delivers the data to east switching unit 150 and to west switching unit 148. The east switching unit 150 can drop westbound channel data to east channel units 156. The west switching unit 148 can insert data from west channel units 152 into the westbound traffic. West switching unit 148 passes the westbound traffic from receive unit 160 either unaltered or with the substituted channels from units 152 to westbound transmit unit (TU) 162 which delivers the data to west terminal 142. The eastbound receive and transmit units and the westbound receive and transmit units are synced and clocked as above.

In the embodiment of FIG. 11, an operator at west channel units 152 can listen to and talk to the west terminal on any channel. An operator at east channel units 156 can listen to and talk to the east terminal on any channel. In this particular embodiment, there are eight channel units 152 and eight channel units 156.

Figure 12:
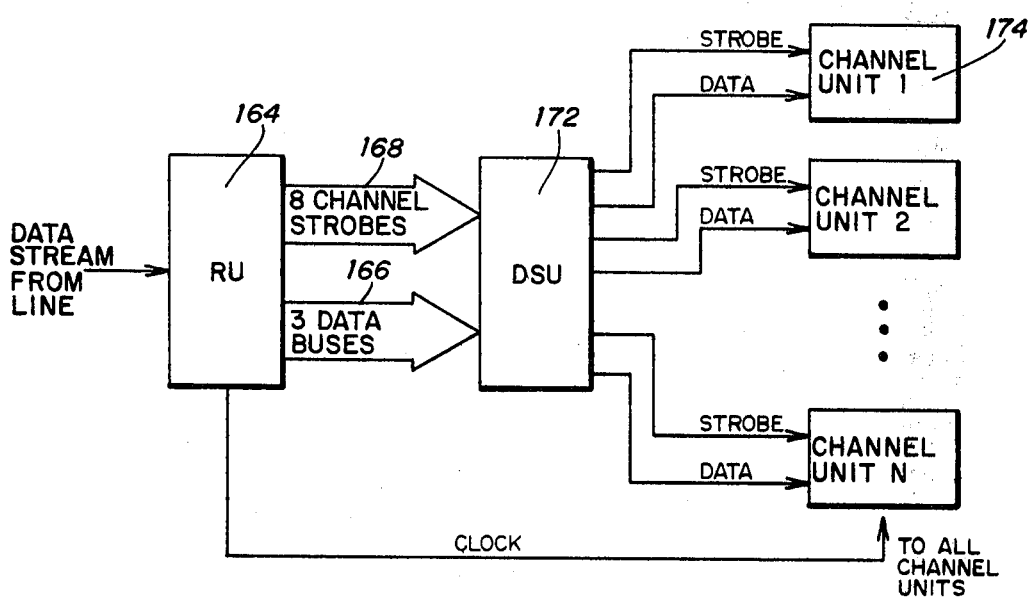

FIG. 12 shows the drop operation of FIGS. 9 and 11. A receive unit 164 demultiplexes the 1.544 megabit per second 24 channel serial data stream into three buses of 512 kilobit per second streams 166 and eight channel strobes 168. Data switching unit 172 routes selected channel strobes and data buses to respectively chosen channel units 174. For example the first channel unit receives one of the eight channel strobes and one of the three data buses which uniquely determines one of the 24 channels from the line. The channel units are clocked by the receive unit.

Figure 13:
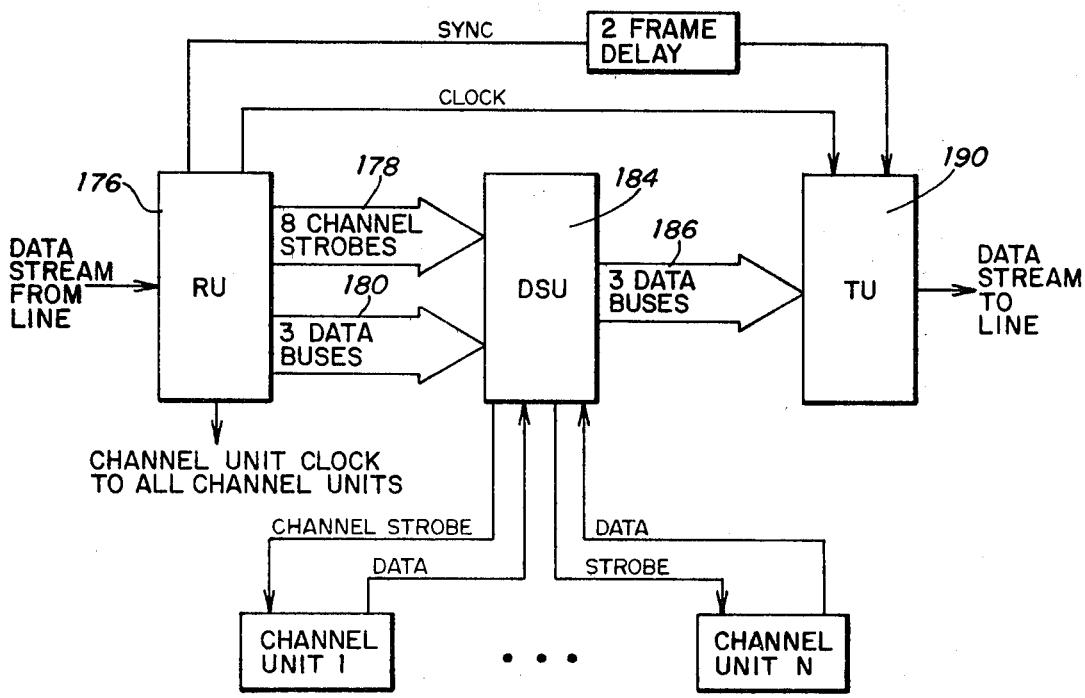

FIG. 13 illustrates the insert operation of FIGS. 9 and 11. A receive unit 176 demultiplexes the 1.544 megabit per second 24 channel serial data stream into eight channel strobes 178 and three buses of 512 kilobit per second data streams 180. Data switching unit 184 normally passes the data streams on output bus 186 unaltered to transmit unit 190 which is synced and clocked by receive unit 176. Data switching unit 184 sends the channel strobes to the channel units for strobing data from the channel units into the data switching unit as respectively chosen by the user. For example, the data switching unit 184 enables one of the eight channel strobes to gate data from the selected channel unit into one of the three data buses 186. Receive unit 176 clocks the channel units.

Figure 14:
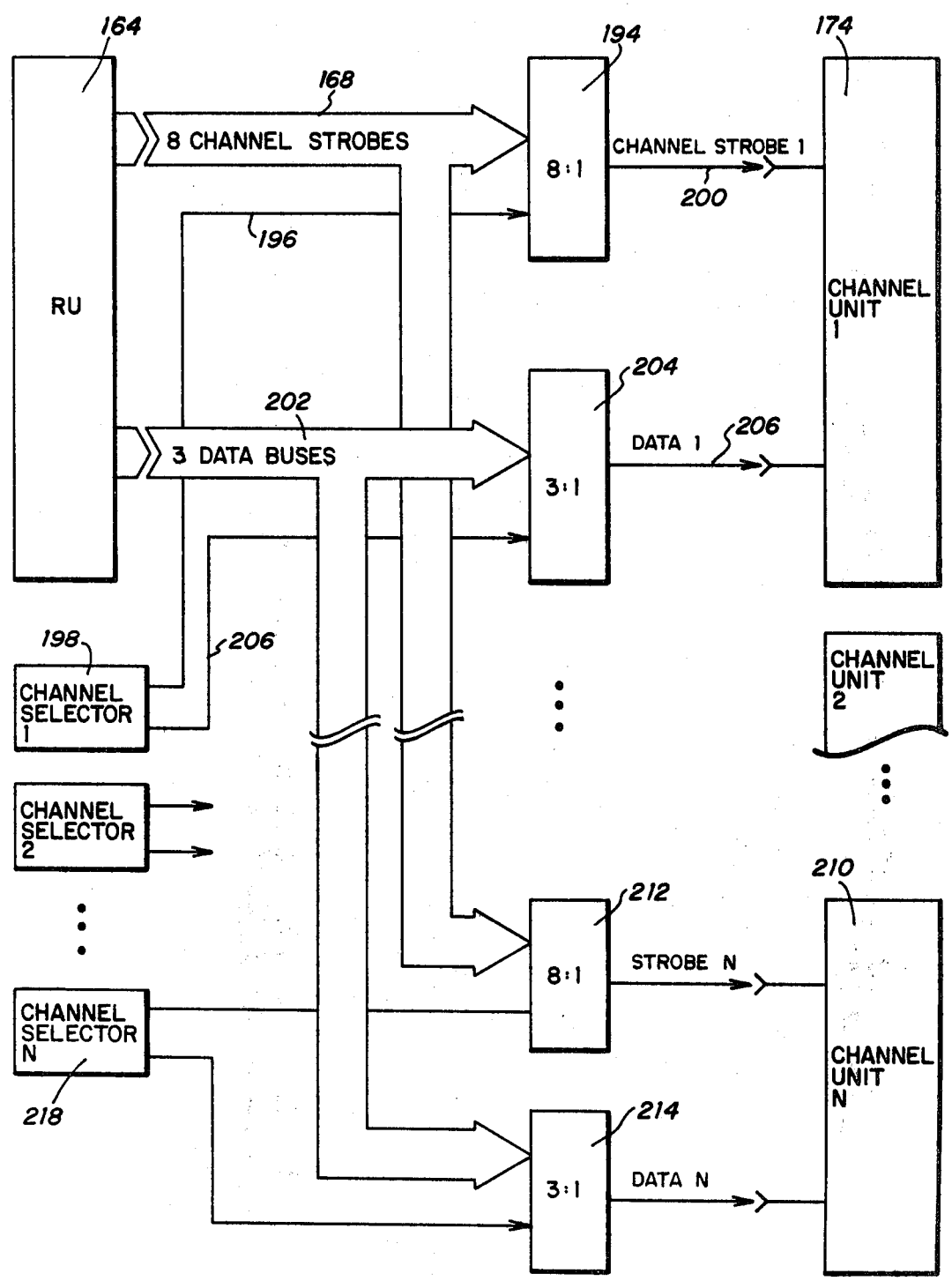

FIG. 14 schematically shows the drop circuitry of FIG. 12. Receive unit 164 sends the eight channel strobes 168 to an 8 to 1 selector/multiplexer 194 for the first channel unit 174. Selector 194 chooses one of the eight channel strobes in accordance with a three bit control code on line 196 from a channel selector 198 for the first channel unit. The chosen channel strobe is output on line 200 to the first channel 174. Receive unit 164 sends the three data streams 202 to a 3 to 1 selector 204 which chooses one of the three buses in accordance with a two bit control code on line 206 from channel selector 198. The chosen bus is output on line 206 to the first channel unit 174.

As seen in FIG. 14, each channel unit has its own set of selectors. In one form, four channel units are provided and the fourth channel unit 210 is provided with a one of eight strobe selector 212, a one of three data bus selector 214, and a user controlled channel selector 218 for making the one of eight and one of three selections.

Figure 15:
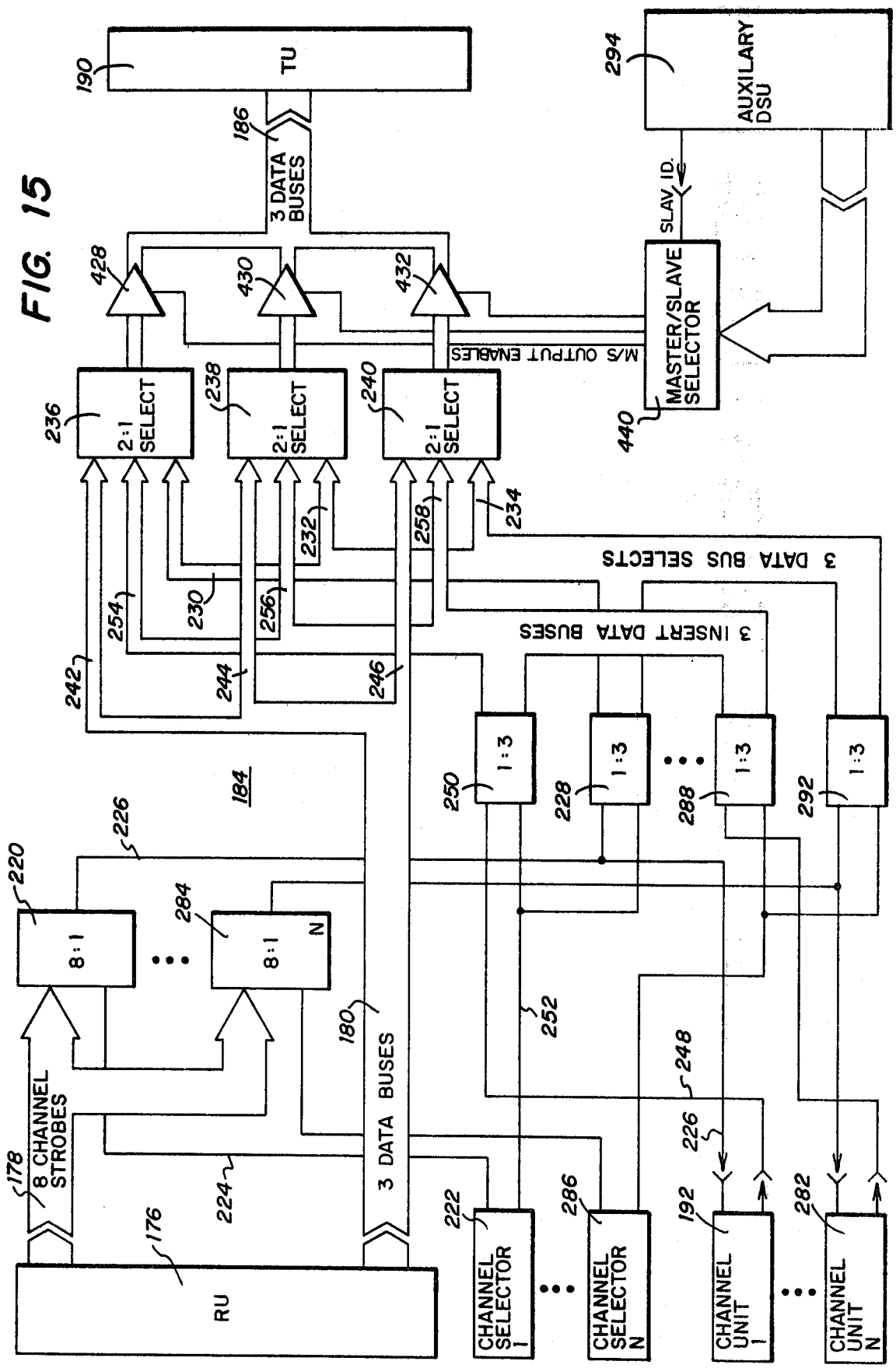

FIG. 15 schematically shows the insert circuitry of FIG. 13. Receive unit 176 sends the eight channel strobes 78 to an 8:1 selector 220 for the first channel unit 192. A user controlled channel selector 222 for the first channel unit sends a three bit control code on line 224 to selector 220 for making the selection. The selected channel strobe is output on line 226 and sent to the first channel unit 192 and to a 1:3 distributor/demultiplexer or decoder 228. Distributor 228 has three output buses 230, 232 and 234 connected respectively to the selection inputs of three selectors 236, 238 and 240. Selector 236 chooses one of its two inputs in accordance with the control code on bus 230. Selectors 238 and 240 are comparable 2:1 selectors.

Receive unit 176 sends three data buses 242, 244 and 246 (collectively 180 in FIG. 13) to selectors 236, 238 and 240, respectively. The data streams on buses 242, 244 and 246 are normally chosen by selectors 236, 238 and 240 in the absence of a data insert signal on buses 230, 232 and 234. The digital data streams on buses 242, 244 and 246 pass through selectors 236, 238 and 240 unaltered and are output on bus 186 to transmit unit 190.

The remaining one of the two inputs to selectors 236, 238 and 240 are data from the channel units to be inserted in the output data streams when enabled by the select control code on buses 230, 232 and 234. The first channel unit 192 is strobed by the selected channel strobe on 226 and sends data on line 248 to a 1:3 distributor 250 comparable to distributor 228. User controlled channel selector 222 for the first channel unit sends a two bit control code on line 252 to distributors 250 and 228 for determining which of the three output buses from each is enabled. Distributor 228 sends the channel strobe from line 226 over one of its output buses 230, 232 and 234. Distributor 250 sends the channel unit insert data from line 248 over one of the three output buses 254, 256 and 258.

Selector 236 normally passes the data stream on bus 242 unaltered therethrough, as noted above. In response to an insert signal on select line 230, selector 236 blocks the passage of data from 242 and instead chooses the data from bus 254 during the channel time slot in which the channel strobe on 230 occurs. This insert data from 254 is passed to output bus 186 and transmit unit 190. The remaining two selectors 238 and 240 perform the comparable function for the other two data buses each having eight channel time slots, thus completing the three by eight matrix uniquely defining the 24 channels and enabling insertion of data into any one of the 24 channels.

Each channel unit has its own 8:1 channel strobe selector comparable to selector 220, its own user controlled channel selector comparable to channel selector 222, and its own set of 1:3 distributors comparable to insert data distributor 250 and channel strobe distributor 228. For example, the Nth channel unit 282 is provided with an 8:1 channel strobe selector 284, a user controlled channel selector 286, a 1:3 input data distributor 288 and a 1:3 channel strobe distributor 292. Insert data distributor 288 shares buses 254, 256 and 258 in common with insert data distributor 250. Channel strobe distributor 292 shares buses 230, 232 and 234 in common with channel strobe distributor 228.

In one form, four channel units are provided, and thus N equals 4. Additional capacity is provided by an auxiliary data switching unit 294 which is identical to data switching unit 184 and provides an additional four channel units. The auxiliary DSU 294 is a master or slave to the main DSU 184, as chosen by the user controlled master/slave selector 440, to be more fully described hereinafter. The slave is active only when it has data to insert. The master handles through-traffic and the insert data from its own set of channel units. The master's output to transmit unit 190 is blocked by inhibit gates 428, 430 and 432 when the slave has data to insert.

Figure 16A:
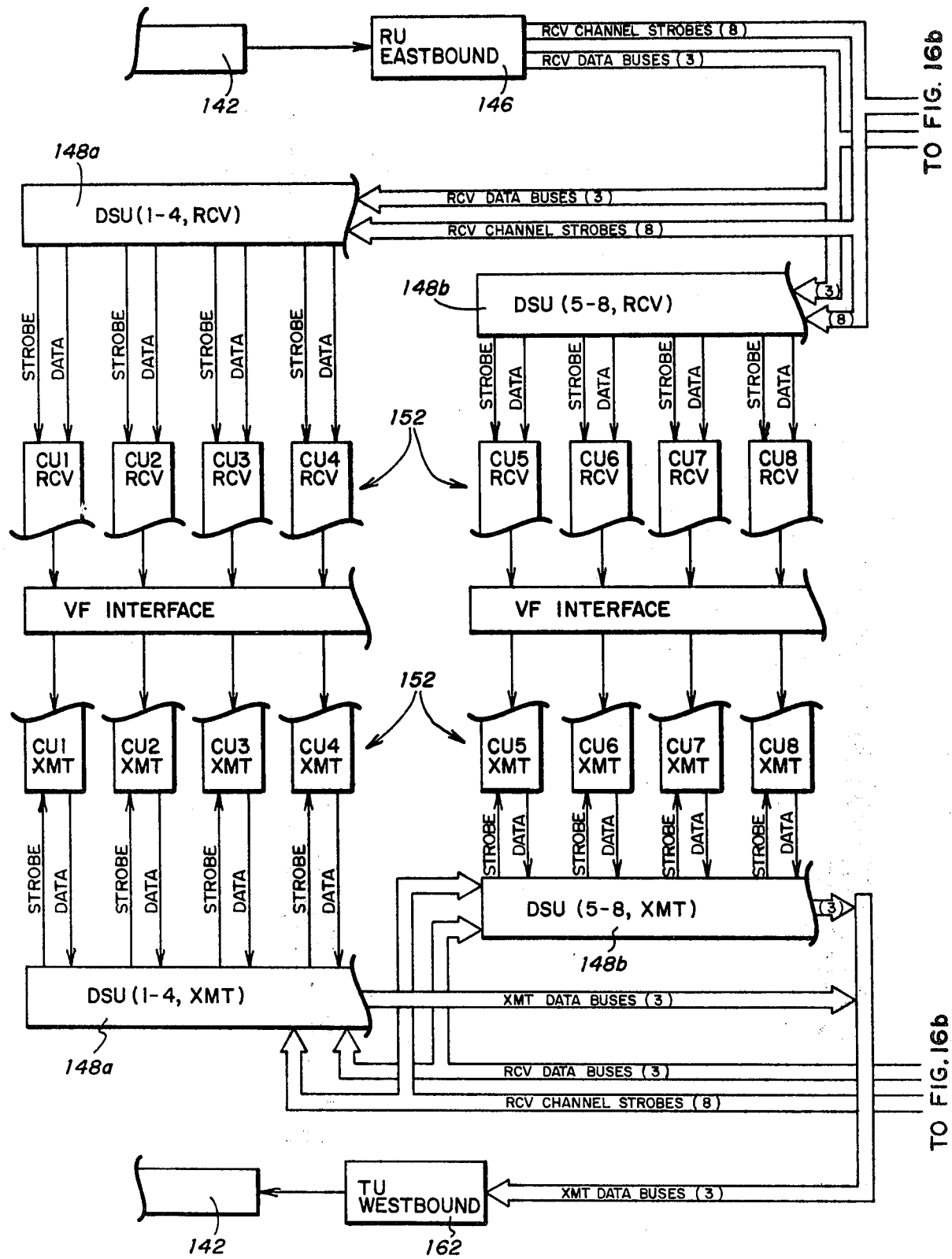
FIGS. 16a and 16b are a detailed signal distribution diagram showing the circuit connections implementing the system of FIG. 11.
Figure 16B:
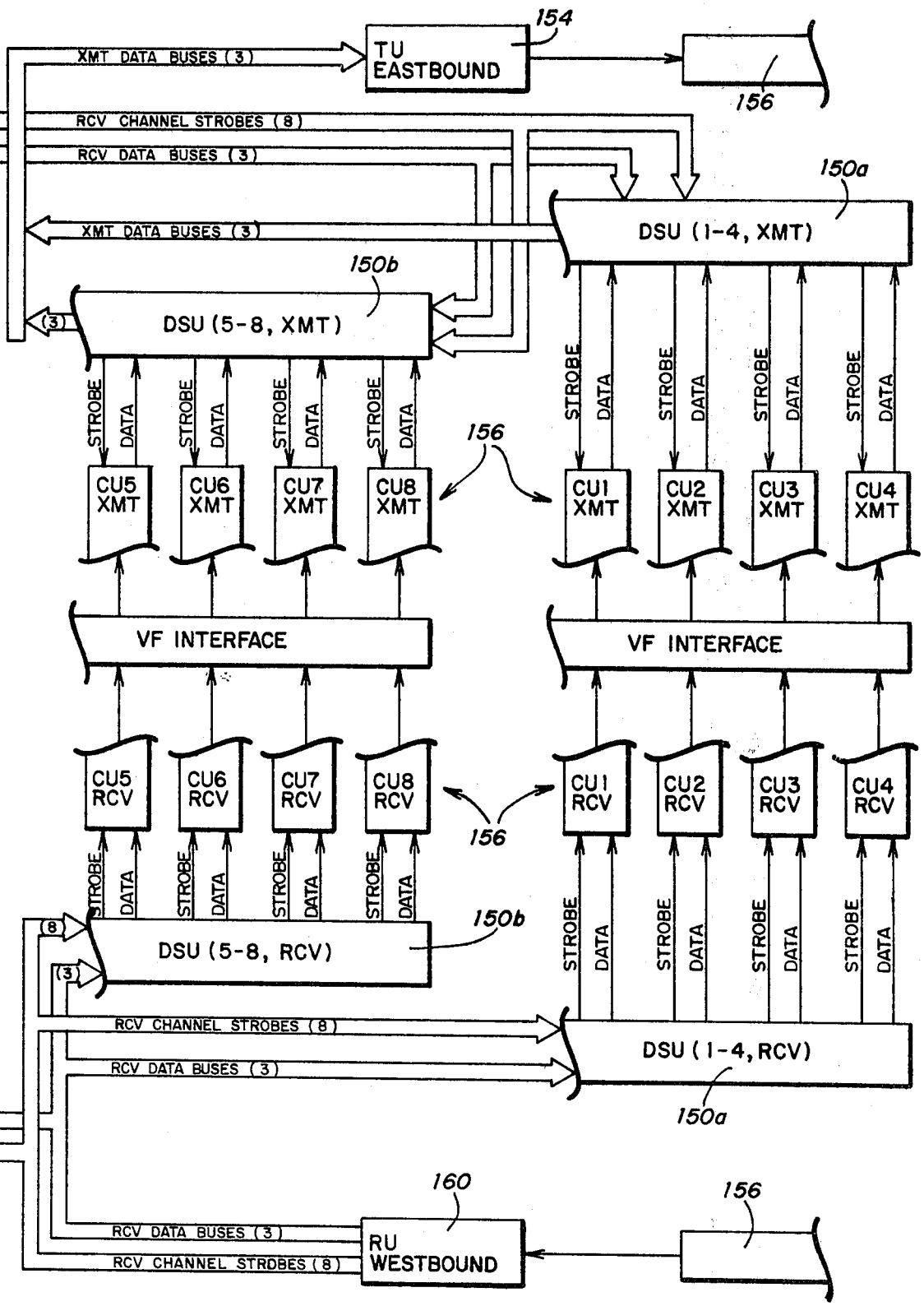

FIG. 16 is a detailed signal distribution diagram showing the circuit connections implementing the system of FIG. 11 and enabling the drop and insert operations described above. Eastbound receive unit 146 demultiplexes the data from west terminal 142 into three data buses of eight channels each and outputs the three buses and eight channel strobes to main data switching unit 148a servicing channel units 1-4 and to auxiliary data switching unit 148b servicing channel units 5-8. These data switching units send the selected channel strobe and data bus to respective west channel units 1-8 (collectively 152 in FIG. 11) for listening at the voice frequency interface. The west channel units 152 have transmit sections sending data from the voice frequency interface to the transmit sections of data switching units 148a and 148b which deliver the data to westbound transmit unit 162 for delivery to west terminal 142. The transmit sections of west data switching units 148a and 148b also receive data and channel strobes from westbound receive unit 160 receiving westbound traffic from east terminal 156. The transmit sections of west data switching units 148a and 148b either pass the digital data from westbound receive unit 160 unaltered or substitute insert channel data from one or more west channel units 152 as chosen by the user.

The data and channel strobes from eastbound receive unit 146 are also delivered to the transmit sections of east main data switching unit 150a and auxiliary data switching unit 150b servicing east channel units 1-4 and 5-8, respectively (collectively 156 in FIG. 11). The transmit sections of the eact channel units 156 send data from the voice frequency interface to transmit sections of data switching units 150a and 150b for substitutional insertion in the data passing therethrough from eastbound receive unit 146 in the chosen channel or channels. The remaining channels are passed unaltered through data switching units 150a and 150b to eastbound transmit unit 154 and east terminal 156. The receive sections of east data switching units 150a and 150b receive the channel strobes and data from westbound receive unit 160 and the selected channel or channels are dropped therefrom (i.e. listened to) through the receive sections of east channel units 156 at the voice frequency interface.

Figure 17A:
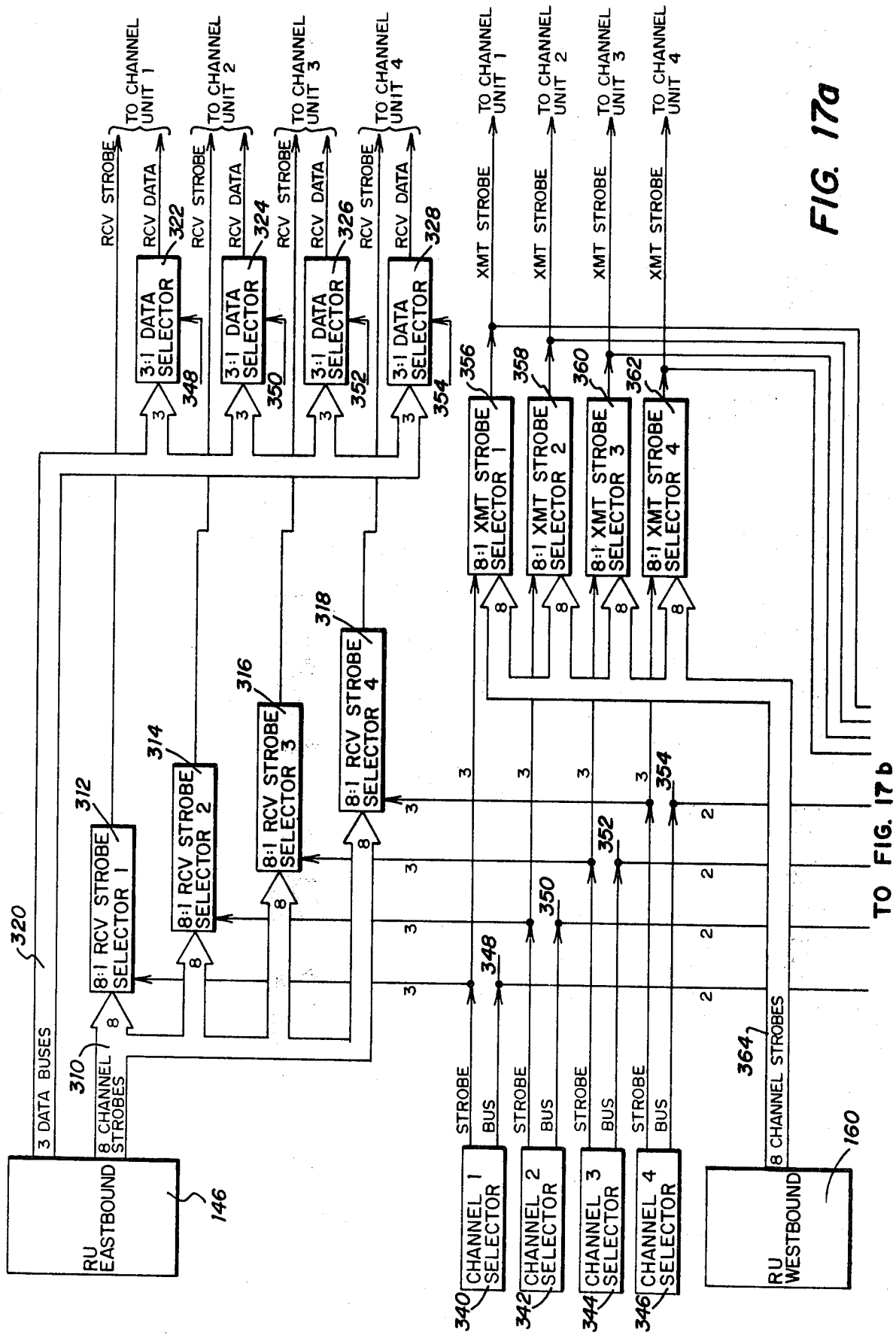

FIGS. 17a and 17b are a composite detailed circuit diagram of the west data switching unit 148 of FIGS. 11 and 16. The east data switching unit 150 is identical.

Referring to FIG. 17a, the eight receive channel strobes from eastbound receive unit 146 are delivered on a bus 310 to receive channel strobe selectors 312, 314, 316 and 318, one for each of four channel units. These selectors are comparable to selector 194 of FIG. 14 and perform a one of eight selection. The chosen channel strobe is sent to the respective channel unit. The three demultiplexed 512 kilobit per second data streams from eastbound receive unit 146 are delivered on a bus 320 to receive data selectors 322, 324, 326 and 328, one for each of four channel units. These selectors are comparable to selector 204 of FIG. 14 and perform a one of three selection. The selected data bus is output to the respective channel unit to uniquely define, in combination with the channel strobe, one of the 24 channels.

User controlled channel selectors 340, 342, 344 and 346 each provide a three bit control code to a respective channel strobe selector 312, 314, 316 and 318, for selecting the channel strobe to be output by each. Channel selectors 340, 342, 344 and 346 also have a data bus selection control code output line 348, 350, 352 and 354, respectively, connected to selectors 322, 324, 326 and 328, respectively. These data bus selection control lines 348, 350, 352 and 354 each carry a two bit control code for designating the one of three selection to be performed by the data selectors.

The three bit channel strobe selection codes from channel selectors 340, 342, 344 and 346 are also delivered to transmit channel strobe selectors 356, 358, 360 and 362, respectively, which are comparable to one of eight channel strobe selector 220 of FIG. 15. The eight channel strobes from westbound receive unit 160 are delivered on bus 364 to transmit channel strobe selectors 356, 358, 360 and 362. Each of these selectors outputs the chosen channel strobe to its respective channel unit for strobing data therefrom.

The selected channel strobes from transmit channel strobe selectors 356, 358, 360 and 362 are also delivered to channel strobe enable distributors 366, 368, 370 and 372, respectively, which are comparable to 1:3 distributor 228 of FIG. 15. The data bus selection control code outputs 348, 350, 352 and 354 from user controlled channel selectors 340, 342, 344 and 346, respectively, are also delivered to channel strobe enable distributors 366, 368, 370 and 372, respectively, for selecting which of the three outputs from each is to carry the transmit channel strobe.

The data bus selection control code outputs 348, 350, 352 and 354 are further delivered to insert data bus distributors 374, 376, 378 and 380, respectively, comparable to 1:3 insert data distributor 250 of FIG. 15. Data distributor 374 receives insert data from the first channel unit as clocked by the transmit channel strobe from selector 356. The control code from line 348 determines which of the three output buses from distributor 374 carries the insert data. The operation of distributors 376, 378 and 380 is comparable.

The three output buses 390, 392 and 394 from each of the data distributors 374, 376, 378 and 380 are connected in common to three respective data insert selectors 396, 398 and 400, comparable to 2:1 selectors 236, 228 and 240 of FIG. 15. The three demultiplexed 512 kilobit per second data streams from westbound receive unit 160 are delivered on buses 402, 404 and 406 to insert selectors 396, 398 and 400, respectively. The selection control inputs for selectors 396, 398 and 400 are delivered on buses 408, 410 and 412, respectively, in common from the three outputs of each transmit strobe enable distributor 366, 368, 370 and 372. Insert selector 396 selects the input from either line 390 or 402 in accordance with the control code on line 408. Selector 396 normally chooses the digital data input from 402 and passes such data unaltered therethrough. When a channel strobe is present on 408, selector 396 chooses its other input 390 for passage therethrough. Selectors 398 and 400 function comparably.

The outputs from data insert selectors 396, 398 and 400 are delivered through respective inhibit gates 428, 430 and 432 to westbound transmit unit 162. These gates may block the passage of the outputs from their respective insert selectors in accordance with an inhibit signal from output inhibit controller 440 which is a user controlled master/slave selector having a control line 448 identifying an identical auxiliary DSU as the master or the slave.

An auxiliary data switching unit may be provided which is identical to that shown in FIGS. 17a and b. The auxiliary channel strobe enable distributors (identical to distributors 366, 368, 370 and 372) have three output buses 408', 410' and 412', which are the counterpart of output buses 408, 410 and 412. Inhibit controller 440 comprises three exclusive OR gates 442, 444 and 446, each having one input from buses 408', 410' and 412', respectively, and the other input from an identity bit line 448. With line 448 grounded low, the main data switching unit of FIGS. 17a and 17b is the master. The auxiliary DSU is the slave and its counterpart twin of line 448 is tied high. When the slave has nothing to insert, then its buses 408', 410' and 412' are each low, and the output of each XOR gate 442, 444 and 446 of the master is low, whereby none of the master's inhibit gates 428, 430 and 432 is activated to a blocking state and hence data from 2:1 selectors 396, 398 and 400 of the master passes through gates 428, 430 and 432 to transmit unit 162.

If the slave has something to insert, then one or more of its buses 408', 410' and 412' goes high. For example, bus 408' goes high during a certain channel time slot, which in turn yields a high output from the master's XOR gate 442, which in turn triggers gate 428 to block data from 2:1 selector 396. The only data presented during that channel time slot on the first data bus to transmit unit 162 is from the slave.

Buses 408, 410 and 412 of the main switching unit in FIGS. 17a and 17b are connected through three AND gates 452, 454 and 456 to buses 408', 410' and 412' of the auxiliary DSU. These AND gates have their other input connected to the identity bit line 448. With line 448 low, the main DSU of FIGS. 17a and 17b is the master, as aforenoted, and the master's signal on buses 408, 410 and 412 do not pass through gates 452, 454 and 456.

In the slave, however, the twin of line 448 is high. If the slave has nothing to insert, then its buses 408', 410' and 412' are low and the outputs of the twins of gates 452, 454 and 456 are low in the slave. These low outputs together with the high state of the twin of line 448 cause a high output from the twins of gates 442, 444 and 446 which in turn cause the twins of inhibit gates 428, 430 and 432 to be in a blocking mode in the slave. Thus when the slave has nothing to insert, the only signals on the data buses to transmit unit 162 are from the master.

If the slave has something to insert, one or more of its buses 408', 410' and 412' goes high and is passed through the respective twins of gates 452, 454 and 456 to the master unit, as aforenoted, and to the slave's twin of XOR gates 442, 444 and 446. One or more of the outputs from these XOR gates in the slave goes low because of the high state of the twin of line 448 in the slave. These one or more low outputs cause the twins of inhibit gates 428, 430 and 432 to go to a nonblocking state and hence enable the slave output to pass to transmit unit 162.

The identical auxiliary data switching unit thus enables additional channel unit capacity. With this modular building block type structure. The cost of two 4-channel data switching units is less than the cost of a single 8-channel data switching unit. The 4-channel DSU is easier to manufacture on a standard printed circuit board. Furthermore, the user need only buy what he needs, and can add more capacity later.

Signaling information (for a European format) and signaling coordination (for a North American format) are provided by a separate bus as a counterpart to the data bus. In a European format, one or more channels are dedicated for carrying signals for indicating off-hook, busy, etc. conditions. This dedicated-channel type signaling is also used in a CCIS system (common channel interoffice signaling), to which the channel bank is of course applicable. In one form of the channel bank, a separate set of buses is used for this signaling, which buses duplicate the data buses and components therefor, such as duplicate selectors, distributors, etc. This duplicate bus and component structure is not illustrated for the sake of clarity and undue prolixity, and to facilitate ease of understanding. The duplicate data and signal bus structure is also preferred for the North American format for carrying coordination information in the opposite direction of the data. In the North American format, FIGS. 1–3, signaling information is interleaved with the data and carried on the data buses. The duplicate counterpart bus and component structure is for return and feedback coordination.

Figure 18:
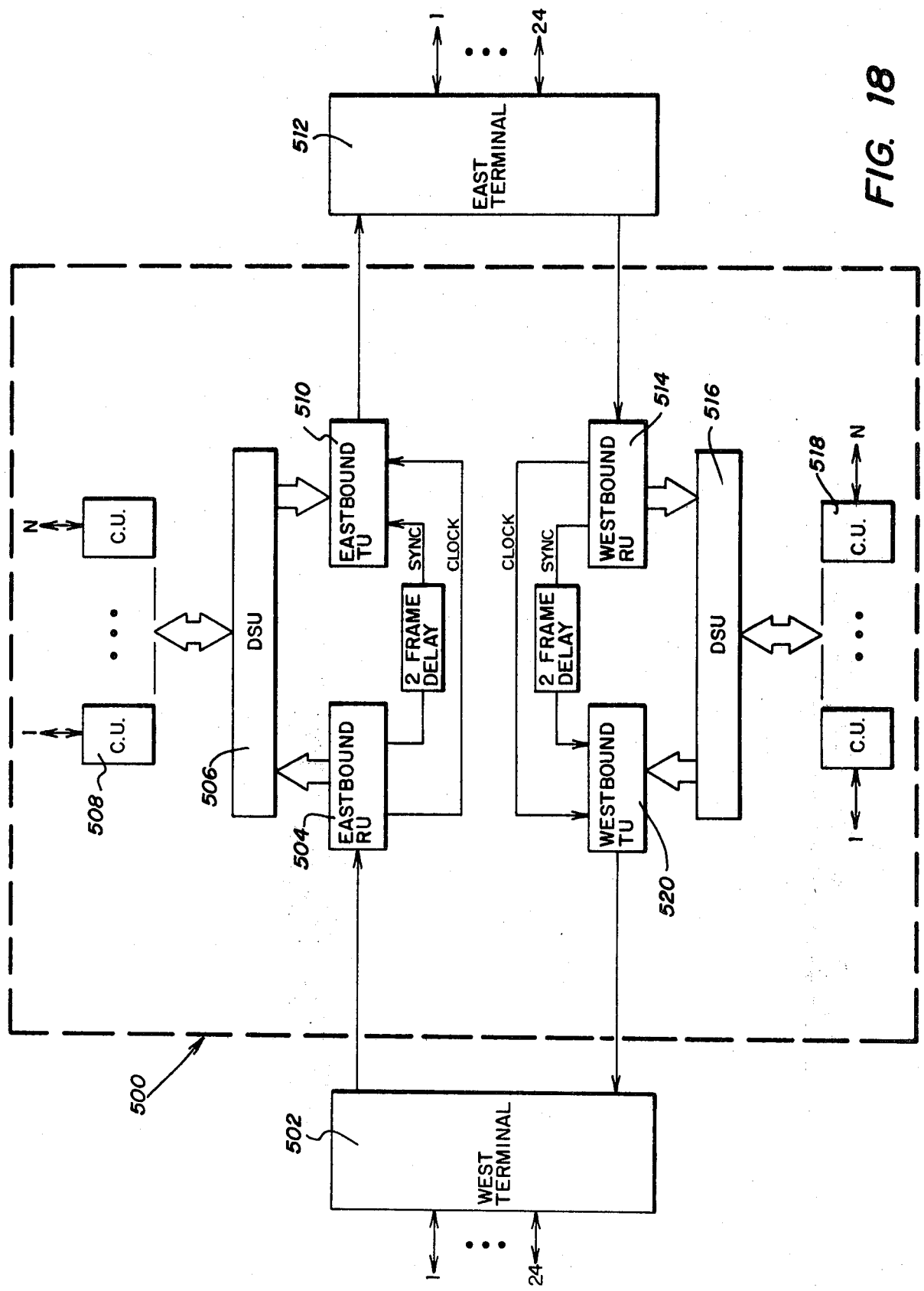

FIG. 18 shows an alternate form of the bidirectional drop and insert channel bank 140 of FIG. 11. In FIG. 11, the user talks and listens to the same end terminal, i.e. channel units 152 drops channels from west terminal 142 and insert channels to west terminal 142, and channel units 156 drop channels from each terminal 157 and insert channels to east terminal 157. In FIG. 18, a channel bank 500 is provided which enables one set of channel units to listen to one end terminal and talk to the other end terminal.

In FIG. 18, west terminal 502 sends the 1.544 megabit per second data stream to eastbound receive unit (RU) 504, which is comparable to eastbound receive unit 146 of FIG. 11. Three demultiplexed 512 kilobit per second data streams and eight channel strobes are sent from eastbound receive unit 504 to a data switching unit (DSU) 506 which is comparable to either of the data switching units 148 or 150 in FIG. 11. Channels are dropped from switching unit 506 to channel units (CU) 508, which are comparable to channel units 152 or 156 of FIG. 11. Data is inserted from channel units 508 to switching unit 506 for substitution in the selected time slot of the data passing through switching unit 506. The unaltered data from eastbound receive unit 504 and the substituted inserted data, if any, from channel units 508 is delivered from switching unit 506 to eastbound transmit unit (TU) 510, which is comparable to eastbound transmit unit 154 of FIG. 11. Eastbound transmit unit 510 sends a multiplexed 1.544 megabit per second data stream to east terminal 512. Eastbound transmit unit 510 and eastbound receive unit 504 are synced and clocked as above. Westbound traffic is comparably handled by westbound receive unit (RU) 514, data switching unit (DSU) 516, channel units (CU) 518, and westbound transmit unit (TU) 520. The first set of channel units 508 listen to west terminal 502 and talk to east terminal 512. The second set of channel units 518 listen to east terminal 512 and talk to west terminal 502.

It is recognized that various modifications are possible within the scope of the appended claims.

We claim:

1. A synchronization system for data coupling apparatus in a digital transmission system carrying data in a given framing format on a transmission medium, comprising:
   input means for receiving from said transmission medium a data stream in said framing format and outputting said data of the data stream, said input means further including
   means for extracting clock signals from the data stream, for aligning said clock signals and the data of the data stream, and for outputting the aligned clock signals, and
   means for deriving framing identification signals from the data stream and separately outputting the derived signals;
   data manipulation means for processing data from said input means to perform a given function on it, said data manipulation means responding to said clock signals to maintain free alignment of the data;
   synchronization delay means responsive to said input means for delaying said framing identification signals by a predetermined increment such that a framing identification signal synchronously aligns with its appropriate frame in data processed by said manipulation means; and
   output means responsive to said clock signals and said delayed framing identification signals, for delivering data from the manipulation means to said transmission medium in accordance with said frame alignment maintained by said manipulation means.

2. The invention according to claim 1 wherein:
   said predetermined delay increment in said synchronization delay means is equal to the inherent delay of data transmission through said data manipulation means; and
   data is delivered from said manipulation means directly to said output means without data buffer storage.

3. The invention according to claim 1 wherein data passes through said output means independently of output alignment identification and data buffering.

4. The invention according to claim 1 wherein data passes through said output means in coordination with said delayed framing identification from said synchronizaton delay means.

5. The invention according to claim 1 wherein said given function performed by said manipulation means on said data includes digital pass-through, said substitutional insertion of data to a known location in said format.

6. The invention according to claim 1 wherein:
   said input means comprises clock recovery means and framing and data word identity means;
   said clock recovery means receives data from said transmission medium and provides data and a recovered clock;
   said framing and data word identity means receives said provided data and the recovered clock and delivers:
     said data in the form of data words to said data manipulation means,
     word identification signals to said manipulation means delimiting said data words,
     said framing identification signals to said synchronization delay means, and
     said clock signals, edge-aligned with said data words, to said manipulation means, to said synchronization delay means, and to said output means.

7. A synchronization system for data coupling apparatus in a digital transmission system carrying data in a given framing format on a transmission medium, comprising:
   clock recovery means receiving data from said transmission medium and delivering data and clock signals recovered therefrom;
   framing and data word identity means receiving data and clock signals from said clock recovery means and delivering data words, said framing and data word identity means further deriving from the data and clock signals and separately outputting input word identification signals delimiting said data words, framing identification signals, and clock signals edge-aligned with said data words;
   data manipulation means receiving said data words, said input word identification signals, and said edge-aligned clock signals from said framing and data word identity means;
   synchronization delay means receiving said framing identification signals from said framing and data identity means; and output means receiving delayed framing identification signals from said synchronization delay means, and receiving manipulated data from said data manipulation means independently of data buffering and independently of output word identification signals, said manipulated data passing through said output means to said transmission medium in coordination with said delayed framing identification signal, said synchronization delay means delaying said framing identification signals such that a delayed framing identification signal synchronously aligns with its appropriate data frame in said output means.

8. A synchronization system for a drop and insert channel bank in a digital transmission system carrying data in a given framing format on a transmission medium, comprising:

a receive unit for receiving from said transmission medium a data stream in said framing format and outputting said data of the data stream, said receive unit further including means for extracting clock signals from the data stream, for aligning said clock signals and the data of the data stream, and for outputting the aligned clock signals, and means for deriving framing identification signals from the data stream and separately outputting the derived signals;

a transmit unit;

a data switching unit connected between said receive unit and said transmit unit for passing and inserting data therethrough, said switching unit responding to said clock signals to maintain frame alignment of the data; and synchronization delay means connected between said receive unit and said transmit unit for delaying said framing identification signals by a predetermined increment such that a framing identification signal synchronously aligns with its appropriate data frame in said transmit unit, said transmit unit including means responsive to said clock signals and said delayed framing identification signals, for delivering data from the switching unit to the transmission medium in accordance with said frame alignment maintained by the switching unit.

9. The invention according to claim 8 wherein:

data is passed through said bank in real time with only inherent delay and without storage data buffering;

said predetermined increment is equal to said real time inherent delay of data passage through said bank; and data is inserted in said bank through said data switching unit in real time without storage data buffering.

10. The invention according to claim 8 wherein:

said receive unit demultiplexes input data from said transmission medium to a lower rate, resulting in an inherent one frame delay between data received by said receive unit and data delivered by said receive unit;

said data switching unit has substantially no delay of pass-through or inserted lower rate data;

said transmit unit multiplexes said lower rate data from said data switching unit to higher rate data output to said transmission medium, resulting in an inherent one frame delay between data received by said transmit unit and data delivered by said transmit unit; and said synchronization delay means delays said framing identification signals by two frames.

* * * * *